Jan. 26, 1965 E. N. ALTER 3,167,510
FLUID AND PROCESS FOR TREATING WELLS
Filed Nov. 25, 1960

INVENTOR.
EMIL N. ALTER
BY
his ATTORNEYS

United States Patent Office 3,167,510
Patented Jan. 26, 1965

3,167,510
FLUID AND PROCESS FOR TREATING WELLS
Emil N. Alter, Bayside, N.Y., assignor to Stein, Hall & Co., Inc., New York, N.Y., a corporation of New York
Filed Nov. 25, 1960, Ser. No. 71,566
19 Claims. (Cl. 252—8.55)

This invention relates to improved fluids for treating wells and to an improved method of "breaking" or of reducing the viscosity of such well-treating fluids.

Fluids of various types are used in well treating operations. One major use of fluids is in earth formation fracturing. In these procedures, the fluid is introduced into the well and forced into surrounding earth formations by application of hydraulic pressure. Fluids used in fracturing may be based on petroleum fractions as a major constituent. It is more usual, however, to employ water-based fluids containing either pure water or brine in major proportion.

Along with water-based fluids, it is preferred to employ an additive which imparts sufficient viscosity to the fluid to maintain entrained solids in suspension. Representative additives which are used include gelatin, starch, pictin, alginates and guar gum. These additives impart a substantial viscosity to the fluid. The high viscosity assists in maintaining sand or other finely-divided solid material in uniform suspension until the material can be placed within the fractured earth formation as a prop. Once this function is completed, it is desirable to reduce the viscosity of the fluid so that it may be easily removed from the formation. In the art, the step of reducing the viscosity of the fluid to facilitate its removal from the producing formation is known as "breaking."

This invention is particularly concerned with a method of breaking well-treating fluids containing guar gum as a viscosity-imparting additive. Breaking is primarily done by one of two methods. The fluid containing guar gum will break naturally by bacterial degradation or by subjection to high temperatures. These natural methods have the disadvantage of requiring a considerable length of time, i.e., several days. In the case of fluids based on brine, as long as a week may be required.

The second method which has found favor involves the use of enzyme preparations. While this method is effective in bringing about a rapid breaking of the fluid, it possesses a number of disadvantages. The enzyme is generally mixed with the guar gum in the dry state. This mixture is fairly stable on storage but as soon as the preparation is hydrated, enzyme action commences and the guar gum is hydrolyzed. The guar gum is hydrated at the surface before it is injected into the well. As long as two hours may be required to hydrate the gum, and a considerable degree of hydrolysis will take place during this step. To compensate for this loss, additional quantities of guar gum must be used initially.

As an additional disadvantage, enzymatic hydrolysis becomes extremely rapid at temperatures around 140° F. This is a temperature which is commonly found in wells and when it is encountered, the viscosity of the fluid may be reduced below that viscosity required for particle suspension before the particle can be forced into the earth formation.

From the above discussion of the prior art, it is evident that a process which will permit full utilization of guar gum so as to maintain maximum viscosity in the fluid until the particulate solid in placed in its desired position within the producing strata and at the same time bring about rapid breaking of the fluid immediately thereafter, has long been needed.

It has been found that by providing for the presence of an alkali metal persulfate at a low level in aqueous well-treating fluids containing guar gum as a viscosity-imparting additive, it is possible to provide a fluid which makes full utilization of the guar gum employed in regard to its viscosity-producing effect and at the same time provide a fluid which will break on subjecting the fluid to an elevated temperature for a reasonably short period of time. Well-treating fluids based on water and containing guar gum and a small percentage of an alkali metal persulfate may be stored for as long as 24 hours at 80° F., a normal surface temperature, without a reduction in the viscosity of the fluid. At the same time, breaking of such a fluid will occur within from one to two hours after the fluid has been subjected to an elevated temperature within the range usually found in deep wells.

The persulfate, e.g., alkali metal persulfates, which may be used according to this invention include potassium persulfate, $K_2S_2O_8$; ammonium persulfate, $(NH_4)_2S_2O_8$; and sodium persulfate, $Na_2S_2O_8$. Of these materials, potassium persulfate is preferrde.

The alkali metal persulfates of this invention are preferably employed at a level ranging from about 0.15% to about 0.5% based upon the weight of the guar gum employed. The amount may be varied, depending upon whether brine or fresh water is employed in the fluid, upon the temperature expected at the breaking site, and upon the time within which the desired delayed breaking is to occur.

At lower temperatures, i.e., 80° F., the breaking action of the preferred potassium persulfate is not appreciable in either brine or fresh water systems, regardless of the concentration employed. At temperatures above 100° F., the degree of breaking action is dependent upon the concentration of potassium persulfate and the temperature. An increase in concentration will provide an increase in breaking action at a given temperature. Similarly, an increase in temperature above about 100° F. will increase the rate of breaking for a given concentration of persulafte. The breaking effect produced by the persulfates is more pronounced in fresh water than in brine systems, so that the latter may require a higher level of persulfate to produce the same result. The preferred concentration of potassium persulfate is .25% based on the weight of guar gum. An increase in potassium persulfate concentration above this level produces an undesirable accelerated breaking action at the usual temperature of about 140° F.

While the alkali metal persulfates are well known oxidizing agents and apparently function as such in the process of this invention, it has been found that other oxidizing agents, for various reasons, are not acceptable. Many other well-known oxidizing agents produce no appreciable breaking action at 60° C., or else precipitate the guar gum in the form of a complex. Potassium permanganate, KMnO₄; potassium chromate, K₂CrO₄; potassium periodate, KIO₄; potassium perchlorate, KClO₄; sodium chlorite, NaClO₂; calcium peroxide, CaO₂; and sodium nitrate, NaNO₃; are examples of oxidizing agents which do not function according to this invention.

The invention may be better understood by reference to the drawings attached hereto, in which.

In each of the FIGURES 1 through 4, curve A represents the viscosity of a 1% solution of pure guar gum; curve B represents the viscosity of a 1% solution of guar gum containing 0.25% potassium persulfate based on the weight of the guar gum; and curve C represents the viscosity of a 1% solution of guar gum containing sufficient enzyme preparation to effect a complete break.

Figure 1:
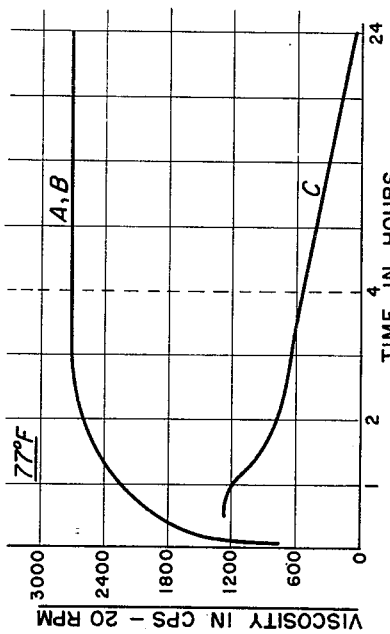
FIGURE 1 shows a series of curves comparing the viscosity of three guar gum solutions at 77° F. over a 24 hour period.

Referring to FIGURE 1, it will be noted that the viscosity of the guar gum solution containing potassium persulfate was the same over a 24 hour period as the viscosity of a pure guar gum solution. The viscosity of a guar gum solution containing the enzyme preparation, however, was initially only about one-half the viscosity of the pure guar gum solution and the viscosity rapidly decreased from that point.

Figure 2:
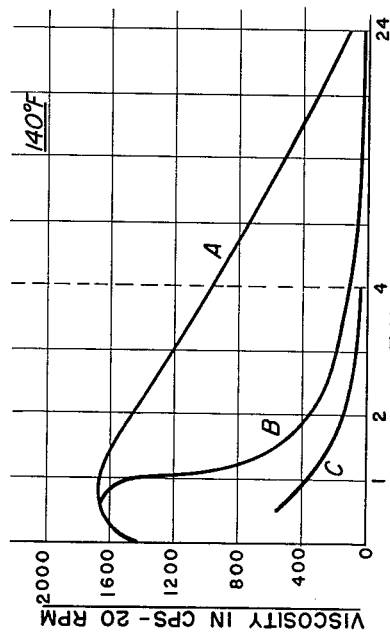
FIGURE 2 shows a series of curves illustrating the viscosity of the solutions described in FIGURE 1, held at 140° F. for a 24 hour period.

In FIGURE 2, when the various solutions were held at 140° F., the pure guar gum solution maintained a high viscosity for approximately two hours and then slowly decreased in viscosity, 24 hours being required for the solution to approach water thinness.

The solution containing potassium persulfate, however, maintained a high viscosity for approximately one hour. During the next hour, the viscosity of the solution rapidly dropped off, and after four hours, its viscosity had reached the same point as was reached in the pure guar gum solution after 24 hours. The guar gum solution containing enzyme had an extremely low viscosity after one-half hour, and the viscosity rapidly dropped off from this point.

Figure 3:
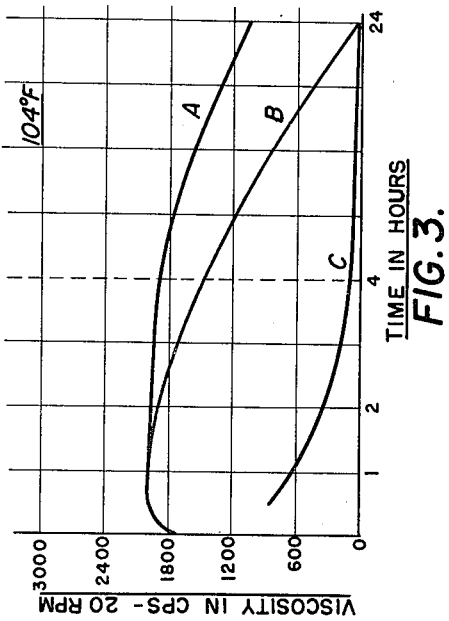
FIGURE 3 shows the viscosity of solutions described in FIGURE 1, held at 104° F. for a 24 hour period.
Figure 4:
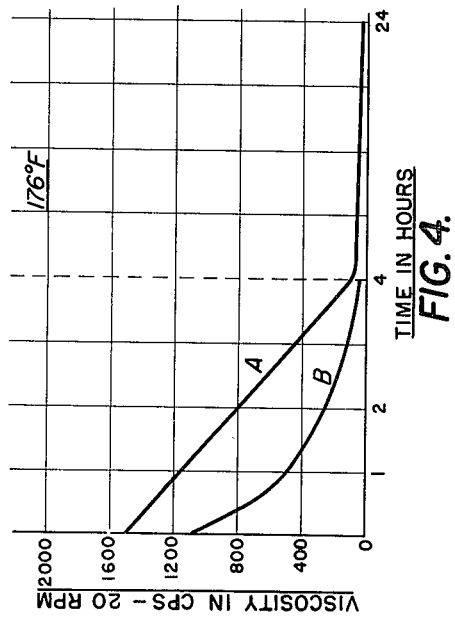
FIGURE 4 shows the viscosity of solutions described in FIGURE 1, held at 176° F. for a 24 hour period.

In FIGURE 3, the curves A and B are intermediate between those of FIGURE 1 and FIGURE 2. FIGURE 4 illustrates the differences between A and B at 176° F. Curve C is omitted from this figure because the enzyme is inactivated at this temperature. It is apparent from each of FIGURES 1 through 3 that the use of an enzyme breaker greatly reduces the initial solids-suspending ability of the fluid.

When the fluids of this invention are used in fracturing processes, various propping agents are suspended therein prior to their introduction into the well. Sand or gravel are conventional propping agents because of their ready availability. Other finely-divided solid materials may be used, if desired.

The following examples further illustrate the process of this invention.

EXAMPLE 1

Table 1 below demonstrates the effect of varying the level of potassium persulfate in the well-treating fluids of this invention. The effect is demonstrated in solutions of tap water and of water containing 10% of sodium chloride. The latter solution is employed to simulate the conditions found in fluids based on naturally occurring brine. Each of the solutions contains guar gum at a level of 60 pounds per 1000 gallons of solution, i.e., 0.72% by weight.

Table 1 gives viscosity measurements in cps., determined by a Brookfield viscosimeter operated at 20 r.p.m. The solutions were prepared by hydrating the guar gum for two hours at room temperature. Thereafter, the solutions were heated on a steam bath for six minutes to obtain an initial reading and then aged at the indicated temperatures for the indicated periods of time.

The potassium persulfate employed had a particle size of approximately 20 mesh with the exception of that employed in Samples 25 and 26. Potassium persulfate having a particle size of 50 mesh was employed in the latter two samples.

*Table 1*

| Sample | °F. Temp. | Percent K₂S₂O₈ | Medium | 2 hr. Visc. | Cold pH | 6 Min. at Temp. | 1 hr. | 2 hr. | 24 hr. | 48 hr. | 62 hr. | 72 hr. | 170 hr. | 214 hr. |
|---|---|---|---|---|---|---|---|---|---|---|---|---|---|---|
| 1 | 80 | 0.25 | Brine | 860 | 6.5 | 860 | 880 | 900 | 900 | 900 | | 860 | 800 | 720 |
| 2 | 80 | 0.5 | do | 820 | 6.4 | 820 | 880 | 880 | 940 | 900 | | 900 | 800 | 760 |
| 3 | 80 | 1.0 | do | 840 | 6.4 | 840 | 880 | 880 | 900 | 870 | | 860 | 800 | 700 |
| 4 | 80 | 0.25 | Water | 800 | 7.4 | 800 | 880 | 880 | 870 | 700 | | 150 | 10 | |
| 5 | 80 | 0.5 | do | 800 | 7.4 | 800 | 860 | 850 | 820 | 460 | | 74 | 10 | |
| 6 | 80 | 1.0 | do | 800 | 7.2 | 800 | 830 | 830 | 810 | 300 | | 58 | 10 | |
| 7 | 100 | 0.25 | Brine | 860 | 6.5 | 660 | 720 | 730 | 670 | 384 | | 199 | 27 | |
| 8 | 100 | 0.5 | do | 820 | 6.4 | 600 | 680 | 700 | 640 | 384 | | 204 | 30 | |
| 9 | 100 | 1.0 | do | 840 | 6.4 | 600 | 680 | 720 | 670 | 440 | | 260 | 60 | |
| 10 | 100 | 0.25 | Water | 800 | 7.4 | 600 | 700 | 700 | 10 | 10 | | | | |
| 11 | 100 | 0.5 | do | 800 | 7.4 | 600 | 660 | 660 | 86 | 18 | | | | |
| 12 | 100 | 1.0 | do | 800 | 7.2 | 600 | 650 | 640 | 60 | 14 | | | | |
| 13 | 150 | 0.25 | Brine | 860 | 6.5 | 364 | 420 | 420 | 150 | 78 | 30 | | | |
| 14 | 150 | 0.5 | do | 820 | 6.4 | 360 | 420 | 410 | 158 | 92 | 50 | | | |
| 15 | 150 | 1.0 | do | 840 | 6.4 | 360 | 420 | 390 | 126 | 70 | 35 | | | |
| 16 | 150 | 0.25 | Water | 800 | 7.4 | 308 | 274 | 196 | 4 | | | | | |
| 17 | 150 | 0.5 | do | 800 | 7.4 | 282 | 180 | 104 | 2 | | | | | |
| 18 | 150 | 1.0 | do | 800 | 7.2 | 248 | 90 | 42 | 2 | | | | | |
| 19 | 200 | 0.25 | Brine | 860 | 6.5 | 250 | 116 | 56 | 8 | | | | | |
| 20 | 200 | 0.5 | do | 820 | 6.4 | 256 | 106 | 38 | 10 | | | | | |
| 21 | 200 | 1.0 | do | 840 | 6.4 | 254 | 70 | 18 | 2 | | | | | |
| 22 | 200 | 0.25 | Water | 800 | 7.4 | 170 | 10 | 8 | 0 | | | | | |
| 23 | 200 | 0.5 | do | 800 | 7.4 | 80 | 8 | 6 | 0 | | | | | |
| 24 | 200 | 1.0 | do | 800 | 7.2 | 46 | 6 | 4 | 0 | | | | | |
| 25 | 150 | 0.25 | do | 800 | 6.9 | 305 | 294 | 210 | 10 | 8 | | | | |
| 26 | 150 | 0.25 | Brine | 800 | 6.5 | 350 | 390 | 370 | 158 | 95 | 39 | | | |

EXAMPLE 2

Tables 2 and 3 below demonstrate the breaking effect of potassium persulfate on guar gum solutions. Solutions were prepared containing 1% of guar gum in distilled water and these solutions were hydrated for 30 minutes at room temperature. Monethanolamine was employed at the levels indicated in order to increase the rate of hydration of the guar gum at room temperature. At the end of 30 minutes, the samples were immediately brought to the indicated temperature. The tables give viscosity measurements determined on a Brookfield viscosimeter operated at 20 r.p.m. The levels of the additives given are based on the weight of the guar gum. The viscosities were determined at the aging temperature. In Table 3, the additives were added as the sample hydrated.

Table 2

|  | Sample | | |
|---|---|---|---|
|  | I | II | III |
| Percent Monoethanolamine | -------- | 0.3 | 0.3 |
| Percent $K_2S_2O_8$ | -------- | 0.05 | 0.15 |
| Cold 2 hr. pH | 6.8 | 7.8 | 7.9 |
| Cold 24 hr. pH | 4.9 | 5.15 | 4.9 |

AGED AT 25° C.

| 30 Minutes | 1,700 | 1,840 | 2,010 |
|---|---|---|---|
| 60 Minutes | 2,200 | 2,300 | 2,380 |
| 120 Minutes | 2,480 | 2,560 | 2,590 |
| 240 Minutes | 2,650 | 2,700 | 2,690 |
| 24 Hours | 2,560 | 2,370 | 2,100 |

AGED AT 40° C.

| 30 Minutes | 1,900 | 2,020 | 2,040 |
|---|---|---|---|
| 60 Minutes | 1,950 | 2,020 | 1,970 |
| 120 Minutes | 1,920 | 2,000 | 1,840 |
| 240 Minutes | 1,920 | 1,820 | 1,530 |
| 24 Hours | 1,020 | 900 | 180 |

AGED AT 60° C.

| 30 Minutes | 1,700 | 1,940 | 1,880 |
|---|---|---|---|
| 60 Minutes | 1,640 | 2,000 | 1,830 |
| 120 Minutes | 1,450 | 1,820 | 1,400 |
| 240 Minutes | 990 | 1,280 | 440 |
| 24 Hours | 100 | 62 | 20 |

AGED AT 80° C.

| 30 Minutes | 1,760 | 2,040 | 1,800 |
|---|---|---|---|
| 60 Minutes | 1,760 | 1,980 | 1,640 |
| 120 Minutes | 1,500 | 1,830 | 900 |
| 240 Minutes | 640 | 680 | 30 |
| 24 Hours | 16 | 15 | 14 |

Table 3

|  | Sample | | |
|---|---|---|---|
|  | IV | V | VI |
| Percent Monoethanolamine | 0.3 | 0.3 | -------- |
| Percent $K_2S_2O_8$ | 0.25 | 0.5 | 2.5 |
| Cold 2 hr. pH | 5.8 | 8.75 | -------- |
| Cold 24 hr. pH | 5.6 | 7.7 | -------- |

AGED AT 25° C.

| 30 Minutes | 2,150 | 1,990 | -------- |
|---|---|---|---|
| 60 Minutes | -------- | -------- | -------- |
| 120 Minutes | 2,600 | 2,580 | -------- |
| 240 Minutes | 2,700 | 2,700 | -------- |
| 24 Hours | 2,650 | 1,110 | -------- |

AGED AT 40° C.

| 30 Minutes | 1,970 | 1,940 | -------- |
|---|---|---|---|
| 60 Minutes | -------- | -------- | -------- |
| 120 Minutes | 1,940 | 2,110 | -------- |
| 240 Minutes | 1,820 | 2,100 | -------- |
| 24 Hours | 52 | 200 | -------- |

AGED AT 60° C.

| 30 Minutes | 1,950 | 1,800 | 1,700 |
|---|---|---|---|
| 60 Minutes | -------- | -------- | -------- |
| 120 Minutes | 1,990 | 800 | 78 |
| 240 Minutes | 110 | 20 | 10 |
| 24 Hours | 15 | 10 | -------- |

I claim:

1. An aqueous well-treating fluid comprising water; a particulate solid propping material; guar gum in an amount sufficient to increase the viscosity of the fluid to a certain initial value; and a persulfate selected from the group consisting of ammonium persulfate and an alkali metal persulfate in an amount sufficient to break rapidly the viscosity of the fluid to a value below the initial viscosity at the relatively high temperature inside the well after the propping material is placed without reducing previously the viscosity of the fluid at the relatively low temperature at the surface of the well.

2. The well-treating fluid of claim 1 wherein the persulfate is potassium persulfate.

3. An aqueous well-treating fluid comprising water; hydrated guar gum in an amount sufficient to impart initially a high viscosity to the fluid; a particulate solid propping material in suspension in the fluid; and a persulfate selected from the group consisting of ammonium persulfate and an alkali metal persulfate in an amount sufficient to break rapidly the viscosity of the fluid below the initial viscosity at the relatively high temperature inside the well after the propping material is placed without reducing previously the viscosity of the fluid at the relatively low temperature at the surface of the well.

4. The well treating fluid of claim 3 wherein the persulfate is potassium persulfate.

5. An aqueous well-treating fluid comprising water; hydrated guar gum in an amount sufficient to increase the viscosity of the fluid to a certain initial value; a particulate solid propping material in suspension in the fluid; and from .15% to .5% by weight of the guar gum of a persulfate selected from the group consisting of ammonium persulfate and an alkali metal persulfate to break rapidly the vicosity of the fluid to a value below the initial viscosity at the relatively high temperature inside the well after the propping material is placed without reducing previously the viscosity of the fluid at the relatively low temperature at the surface of the well.

6. The well-treating fluid of claim 5 wherein the persulfate is potassium persulfate.

7. An aqueous well-treating fluid comprising brine; a particulate solid propping material; guar gum in an amount sufficient to impart initially a high viscosity to the fluid; and a persulfate selected from the group consisting of ammonium persulfate and an alkali metal persulfate in an amount sufficient to break rapidly the viscosity of the fluid below the initial viscosity at the relatively high temperature inside the well after the propping material is placed without reducing previously the viscosity of the fluid at the relatively low temperature at the surface of the well.

8. The well-treating fluid of claim 7 wherein the persulfate is potassium persulfate.

9. An aqueous well-treating fluid comprising brine; hydrated guar gum in an amount sufficient to impart initially a high viscosity of the fluid; a particulate solid propping material in suspension in the fluid; and from .15% to .5% by weight of the guar gum of a persulfate selected from the group consisting of ammonium persulfate and an alkali metal persulfate to break rapidly the viscosity of the fluid below the initial viscosity at the relatively high temperature inside the well after the propping material is placed without reducing previously the viscosity of the fluid at the relatively low temperature at the surface of the well.

10. The well-treating fluid of claim 9 wherein the persulfate is potassium persulfate.

11. An aqueous well-treating fluid comprising water; hydrated guar gum in an amount sufficient to impart initially a high viscosity to the fluid; a particulate solid propping material in suspension in the fluid; and from .15% to .5% by weight of guar gum of a persulfate selected from the group consisting of ammonium persulfate and an alkali metal persulfate; said fluid being capable of having a constant high viscosity at the surface temperature of the well; said fluid being capable of having its viscosity rapidly reduced subsequently to below the initial viscosity at the higher temperature inside the well after said propping material is placed.

12. A method for treating wells to project fluid into formations surrounding the well by application of pressure to the fluid and producing the well which comprises: the step of introducing into the well a fluid comprising water, guar gum in an amount sufficient to impart initially a high viscosity to the fluid and from .15% to .5% by weight of guar gum of a persulfate selected from the group consisting of ammonium persulfate and an alkali metal persulfate to break rapidly the viscosity of the fluid below the initial viscosity at the relatively high temperature inside the well after a particulate solid propping material is placed without reducing previously the viscosity of the fluid at the relatively low temperature at the surface of the well.

13. A method for treating wells to project fluid into formations surrounding the well by application of pressure to the fluid and producing the well which comprises the step of introducing into the well a fluid comprising water, guar gum in an amount sufficient to impart initially a high viscosity to the fluid and from .15% to .5% by weight of guar gum of a persulfate selected from the group consisting of ammonium persulfate and an alkali metal persulfate to break rapidly the viscosity of the fluid below the initial viscosity at the temperature of about 140° C. inside the well after a particulate solid propping material is placed without reducing previously the viscosity of the fluid at the temperature of about 80° F. at the surface of the well.

14. The method of claim 13 wherein the persulfate is potassium persulfate.

15. A method for treating wells which comprises the steps of introducing into a well an aqueous fluid comprising water, hydrated guar gum in an amount sufficient to impart initially a high viscosity to the fluid, a particulate solid propping material in suspension in the fluid and from .15% to .5% by weight of guar gum of a persulfate selected from the group consisting of ammonium persulfate and an alkali metal persulfate to break rapidly the viscosity of the fluid below the initial viscosity at the relatively high temperature inside the well after the propping material is placed without reducing previously the viscosity of the fluid at the relatively low temperature at the surface of the well; projecting the fluid into formations surrounding the well by application of pressure to the fluid; and producing the well.

16. The method of claim 15, wherein the persulfate is potassium persulfate.

17. A method for treating wells which comprises preparing a breaking fluid comprising water, hydrated guar gum in an amount sufficient to impart initially a high viscosity to the fluid, a particulate solid propping material in the fluid and .15% to .5% by weight of guar gum of a persulfate selected from the group consisting of ammonium persulfate and an alkali metal persulfate, said fluid having a constant high viscosity at the surface temperature of the well; projecting said fluid into formations surrounding the well by application of pressure to the fluid; placing said propping material, said fluid having a rapidly reduced viscosity below the initial viscosity at the higher temperature inside the well subsequent to the placing of said propping material; removing said fluid with reduced viscosity from said well; and producing the well.

18. A method for treating wells which comprises preparing a breaking fluid comprising water, hydrated guar gum in an amount sufficient to impart initially a high viscosity to the fluid, a particulate solid propping material in suspension in the fluid and from .15% to .5% by weight of guar gum of a persulfate selected from the group consisting of ammonium persulfate and an alkali metal persulfate, said fluid having constant viscosity at the 80° F. surface temperature of the well; projecting the fluid into formations surrounding the well by application of pressure to the fluid; placing said propping material, said fluid having a rapidly reduced viscosity below the initial viscosity at the 140° F. temperature inside the well subsequent to the placing of said propping material; removing said fluid with reduced viscosity from said well; and producing the well.

19. A method for treating wells which comprises preparing a breaking fluid comprising water, hydrated guar gum in an amount sufficient to impart initially a high viscosity to the fluid, a particulate solid propping material in suspension in the fluid and from .15% to .5% by weight of guar gum of potassium persulfate, said fluid having a constant high viscosity at the 80° F. surface temperature of the well; projecting the fluid into formations surrounding the well by application of pressure to the fluid; placing said propping material, said fluid having a rapidly reduced viscosity below the initial viscosity at the 140° F. temperature inside the well within 4 hours and subsequent to the placing of said propping material; removing said fluid with reduced viscosity from said well; and producing the well.

References Cited in the file of this patent
UNITED STATES PATENTS

| 1,873,631 | Pfister | Aug. 23, 1932 |
| 2,444,412 | Swanson | July 6, 1948 |
| 2,483,936 | Roberts | Oct. 4, 1949 |
| 2,681,704 | Menaul | June 22, 1954 |
| 2,767,167 | Opie et al. | Oct. 16, 1956 |
| 3,024,191 | Jones | Mar. 6, 1962 |

OTHER REFERENCES

Gregory: Uses and Applications of Chemicals and Related Materials, published 1939 by Reinhold Pub. Co. of New York, vol. 1, page 484.